United States Patent [19]

Story

[11] 4,075,737
[45] Feb. 28, 1978

[54] METHOD AND DEVICE FOR EVERTING TUBULAR CASINGS

[75] Inventor: Alfred Donald Story, Danville, Ill.

[73] Assignee: Teepak, Inc., Chicago, Ill.

[21] Appl. No.: 724,893

[22] Filed: Sep. 20, 1976

[51] Int. Cl.$^2$ .............................................. A22C 13/00
[52] U.S. Cl. .......................................... 17/45; 17/42; 17/43; 223/40
[58] Field of Search .................. 17/35, 42, 49, 43, 45; 53/392; 223/39–43; 141/319

[56] References Cited

U.S. PATENT DOCUMENTS

| | | | |
|---|---|---|---|
| 620,251 | 2/1899 | Pratt | 223/39 |
| 775,992 | 11/1904 | Shallenberger | 223/43 |
| 941,164 | 11/1909 | Murphy | 223/39 |
| 1,030,336 | 6/1912 | Shields | 223/39 |
| 1,548,431 | 8/1925 | Bates | 223/39 |
| 2,231,954 | 2/1941 | Scherobel | 17/45 |
| 2,464,286 | 3/1949 | Bates | 223/39 |
| 2,818,205 | 12/1957 | DeSpain | 223/39 |
| 3,131,839 | 5/1964 | Norman et al. | 223/43 |
| 3,242,524 | 3/1966 | Witzween | 17/43 |
| 3,454,981 | 7/1969 | Martinek | 17/42 |
| 3,568,898 | 3/1971 | Griffin, Jr. | 223/43 |
| 3,762,613 | 10/1973 | Hardaker | 223/40 |
| 3,880,098 | 4/1975 | Ichioka | 93/84 TW |
| 3,894,312 | 7/1975 | McNeill | 17/43 |
| 3,919,739 | 11/1975 | Kawai | 17/35 |

FOREIGN PATENT DOCUMENTS 1,198,988  8/1965  Germany ................. 17/43

Primary Examiner—Russell R. Kinsey
Assistant Examiner—Paul J. Hirsch
Attorney, Agent, or Firm—John J. Kowalik; Joseph E. Kerwin

[57] ABSTRACT

A method and device for everting thin-walled flexible tubular casings or the like by passing a distal portion of the casing through a ring member, folding the casing back over the ring, grasping the free end of the casing, and displacing the ring relative to the fixed casing end, whereby the casing is drawn through and around the ring and is thereby everted.

11 Claims, 2 Drawing Figures

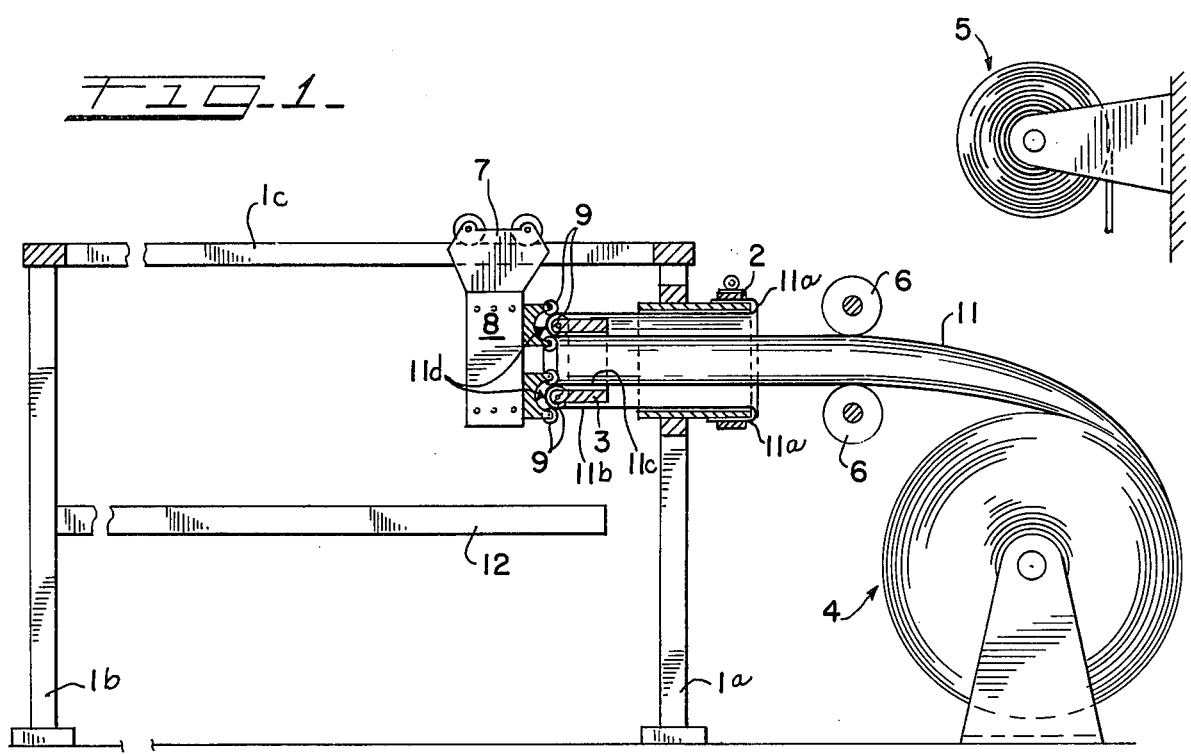
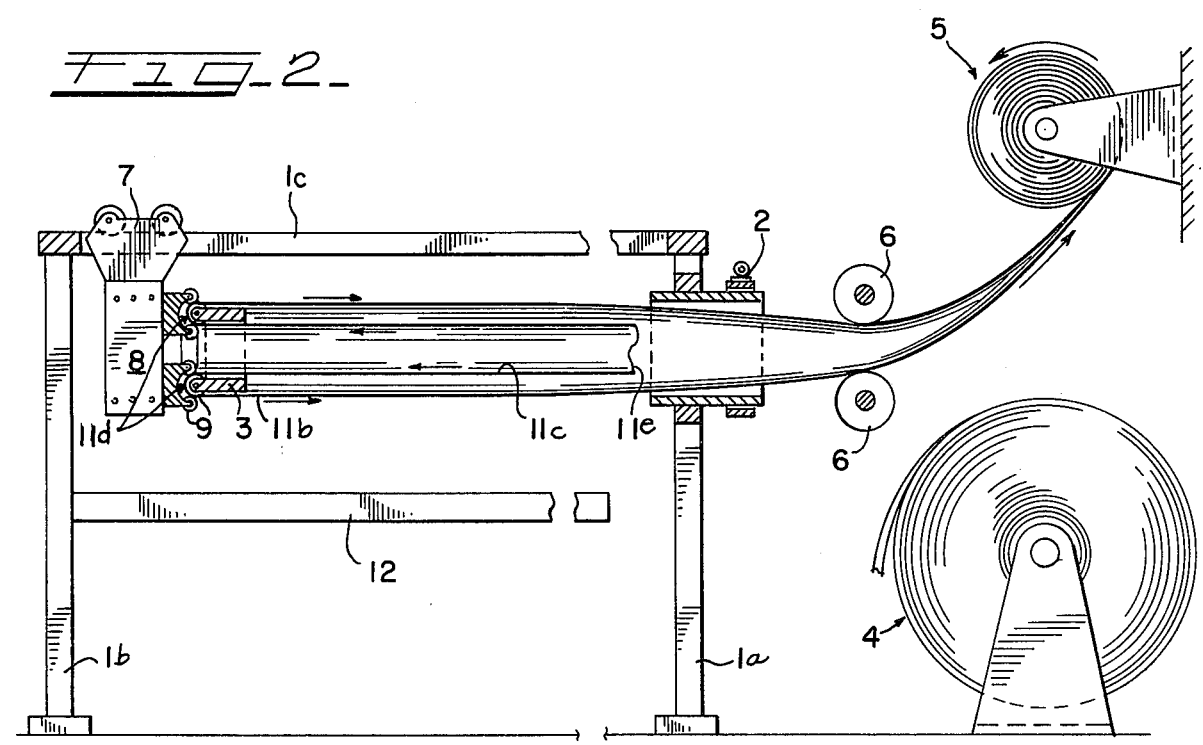

METHOD AND DEVICE FOR EVERTING TUBULAR CASINGS

SUMMARY OF THE INVENTION

This invention relates to tubular food casings and, more particularly, to a method and apparatus for everting such casings.

It is frequently desired to provide cellulosic or similar food casings having an inner coating or layer of a barrier material such as a vinylidene chloride polymer such as polyvinylidene chloride. This is generally accomplished by forming the coating on the outer surface of a casing and then everting the coated casing to place the coating in its desired final location. Current methods of eversion generally involve sealing one end of a section of casing and then utilizing a pressure differential to draw the closed end portion through the remainder of the casing. Methods of this type are generally unsatisfactory in that they require a great deal of work space. Furthermore, the forces required to draw a closed end portion through a casing vary with the length of the casing. Thus, inversion methods utilizing a pressure differential are limited by the circumferential or hoop strength of the casing material which determines the pressure tolerance of the casing. This results in the inability to evert casing beyond a certain maximum length.

It is therefore a primary object of the present invention to minimize the area required to evert thin-walled flexible tubular casings.

It is a further object to provide an inversion method which permits eversion of increased lengths of such casings.

It is yet another object to provide an apparatus for performing and achieving the above-described method and objective.

Other and additional objects of the invention will become apparent from the specification, the claims, and the accompanying drawings.

BRIEF DESCRIPTION OF THE DRAWINGS

FIG. 1 is a schematic view of the device of the present invention, illustrating one stage of the eversion process.

FIG. 2 is a schematic view, similar to FIG. 1, illustrating a second stage of the eversion process.

DESCRIPTION OF THE PREFERRED EMBODIMENT

As shown in the drawings, the device of the present invention comprises a frame 1, a clamp 2 for gripping a distal end portion of an everted portion of a casing, a toroidal ring 3 for placement in a loop comprising the juncture between an everted portion of a casing and a following noneverted portion, and means for displacing the ring 3.

The frame 1 comprises spaced vertical members 1a and 1b, and a horizontal connecting track member 1c.

Supply and takeup reels 4 and 5 respectively, are located near the frame 1. A pair of guide rollers 6 is positioned between the supply reel 4 and the clamp 2, which is attached to frame member 1a.

The ring 3 is displaced by being coupled to carriage 7 which is driven along track member 1c by a suitable motor (not shown). The coupling is effected magnetically, with magnet 8, mounted on the carriage 7, coupling the magnetic material of which the ring 3 is largely composed. A number of Teflon (trademark) coated roller members 9 are rotatably carried in one face of the ring 3, arranged for cooperative engagement with similar members 9 arranged in two concentric rings in the opposing face of the magnet 8. These roller members 9 serve to reduce the drag forces impressed on a casing being drawn between the ring 3 and the magnet 8.

In operation, a free end 11a of casing 11 is drawn from the supply reel 4 and passed through the center of the ring 3, doubled back over the ring, and fastened in the clamp 2. Thus, the ring 3 is located in a loop defined by the juncture 11d of an everted portion 11b of the casing 11 and the following noneverted portion of casing 11c. The ring 3 is coupled to the magnet 8, and the magnet 8 is then drawn along the track 1c.

As the carriage 7 moves along the track, drawing the ring 3 thereafter, the juncture 11d moves along the casing 11, i.e. noneverted casing 11c is drawn through and around the ring 3, whereby it is everted.

When the carriage 7 has reached the limit of its travel, adjacent the vertical support member 1a, the uninverted portion 11c of the casing is severed adjacent the clamp 2. The free end 11a of the casing is now removed from the clamp 2 and attached to the takeup reel 5, and wound thereon. As the casing 11 is wound on the takeup reel 5, the cut end 11e of the casing 11 is drawn through the interior of the everted portion 11b of the casing 11. When the cut end 11e passes through the ring 3, the casing is no longer supported at the end of the frame 1 near the frame member 1a, and drops down into trough 12 which underlies the track member 1c. The trough 12 thus serves to prevent the everted casing 11b from falling to the floor or otherwise becoming soiled or injured. The casing 11 is wound on the takeup reel 5 until the entire everted casing 11b is collected thereon.

It is important to note that the amount of casing 11 everted in the course of a single operation is equal to twice the distance between the two vertical frame members 1a and 1b. This is to be compared with the prior art wherein the length of casing everted is generally found to be equal to, or less than, the length of the equipment employed. It is therefore seen that the present invention requires only half as much space to evert a given length of casing.

It is further noted that the forces impressed on the casing during the eversion process are substantially in tension, and little or no hoop stress is present. Thus, the length of casing which may be everted is independent of the hoop strength of the casing material. As the axial strength of most commonly used casing materials far exceeds the circumferential strength, an increased length of casing may be everted, by the present method and device, without injury thereto.

I claim:

1. A device for everting a thin-walled flexible tubular casing or the like, comprising a support frame, clamping means mounted on the frame for gripping a distal end portion of an everted portion of the casing, a ring for placement in a loop formed by a juncture between said everted portion and a following noneverted portion attendant to said portions being telescoped with respect to each other, and means external of said casing for displacing said ring relative to said clamping means lengthwise of the casing for thus everting said noneverted portion of the casing.

2. A device for everting a thin-walled flexible tubular casing or the like comprising a frame, clamping means for gripping a distal end portion of an everted portion of the casing, a ring for placement in a loop comprising the juncture between said everted portion and a following noneverted portion, and means for displacing said ring relative to said clamping means, whereby said noneverted portion of the casing is everted, wherein said displacing means includes means for coupling said ring through said loop of casing.

3. The invention of claim 2, wherein said ring includes magnetic material, and said displacing means includes a magnet adapted to attract said ring and maintain the same in close relation therewith, whereby said ring may be displaced by displacing said magnet.

4. The invention of claim 3, wherein said ring and said displacing means each include means for reducing the drag force on a casing being drawn therebetween.

5. The invention of claim 4, wherein said displacing means includes a track and a motor, said magnet being mounted on said track and being driven therealong by said motor.

6. The invention of claim 4, wherein said drag-reducing means on said displacing means and said ring comprise a plurality of mating rotatable members disposed in the opposing faces of said ring and said displacing means.

7. A device for everting a thin-walled flexible tubular casing or the like, comprising a toroidal ring member about which a distal end portion of casing may be everted, a clamp for securing the distal end of said everted portion of casing, means for displacing said ring member relative to said clamp for drawing said casing through the ring and thereby everting said casing, and means for holding said ring through said casing in operative relation to said means for displacing.

8. A device for everting a thin-walled flexible tubular casing or the like, comprising a frame, a toroidal ring member about which a distal end portion of casing may be everted, a clamp for securing the distal end of said everted portion of casing, and means on the frame for displacing said ring member relative to said clamp, whereby the casing is drawn through the ring and thereby everted, wherein said displacement means comprises a movable member magnetically coupleable to said ring member.

9. The device of claim 8 wherein said ring member and said movable member comprise facing surfaces, and means on said surfaces for reducing drag forces impressed on the casing being drawn therebetween.

10. A method of everting a length of thin-walled flexible tubular casing or the like, comprising the steps of:

a. everting a distal portion of the casing around a ring by passing the casing solely through the ring and telescoping an everted outer portion of the casing about an inner portion thereof;

b. gripping the distal end of said everted portion of casing; and c. displacing said ring relative to said distal end of the casing and thereby drawing the inner portion of the casing through said ring and thus everting the casing.

11. A method of everting a length of thin-walled flexible tubular casing or the like, comprising the steps of;

a. everting a distal portion of the casing around a ring;

b. gripping the distal end of said everted portion of casing; and c. displacing said ring relative to said distal end of the casing, whereby the casing is drawn through said ring and thereby everted, and said ring is displaced by magnetically coupling the same to a movable member exterior to said casing.

* * * * *